Feb. 17, 1970    D. E. WILLIS    3,495,473
VEHICLE TRANSMISSION SHIFTING APPARATUS
Filed March 25, 1968    4 Sheets-Sheet 1
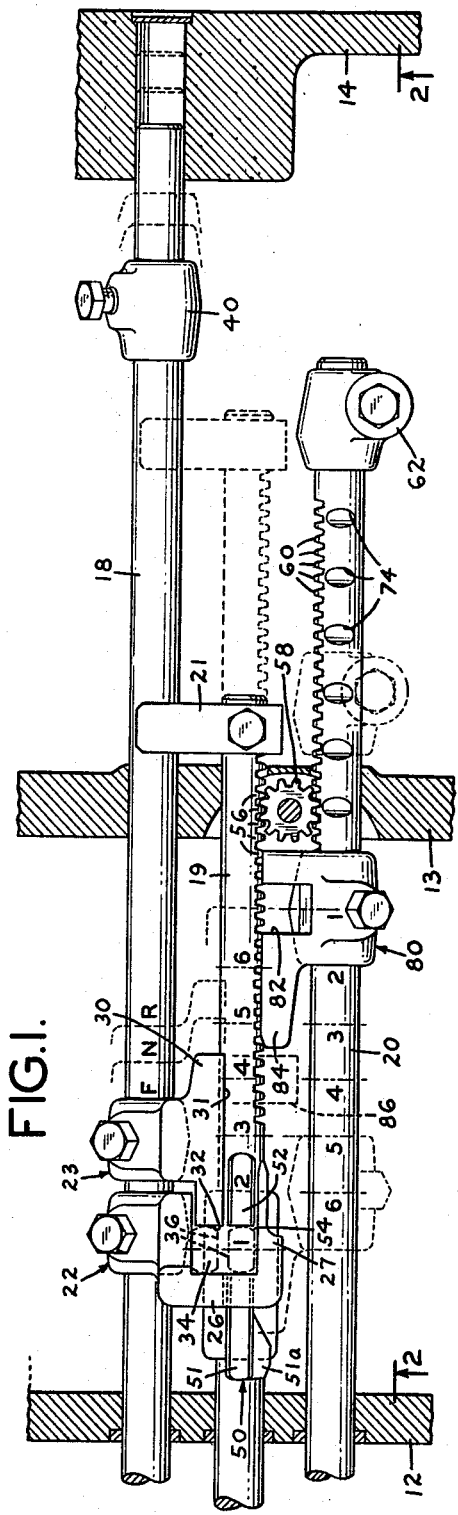
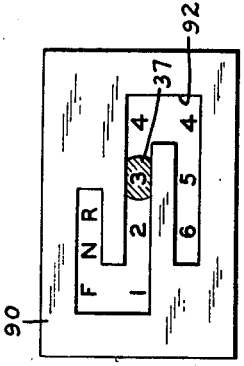
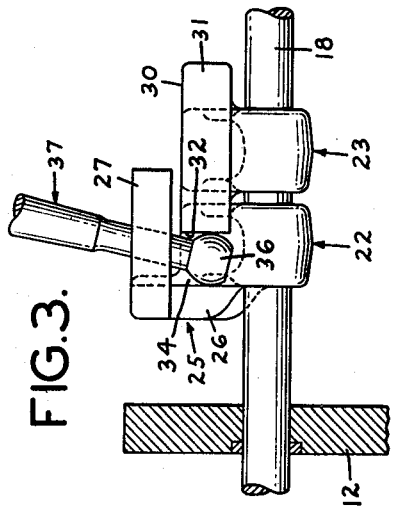
INVENTOR
DELBERT E. WILLIS
BY
HIS ATTORNEYS Feb. 17, 1970

D. E. WILLIS 3,495,473

VEHICLE TRANSMISSION SHIFTING APPARATUS

Filed March 25, 1968

INVENTOR
DELBERT E. WILLIS
BY

Brumbaugh, Frey, Graves & Donohue

HIS ATTORNEYS

Feb. 17, 1970 D. E. WILLIS 3,495,473
VEHICLE TRANSMISSION SHIFTING APPARATUS
Filed March 25, 1968 4 Sheets-Sheet 4

INVENTOR
DELBERT E. WILLIS
BY
HIS ATTORNEYS

United States Patent Office 3,495,473
Patented Feb. 17, 1970

3,495,473
VEHICLE TRANSMISSION SHIFTING APPARATUS
Delbert E. Willis, Hagerstown, Md., assignor to Mack Trucks, Inc., Allentown, Pa., a corporation of New York
Filed Mar. 25, 1968, Ser. No. 715,778
Int. Cl. G05g 9/00, 13/00
U.S. Cl. 74—473                    8 Claims

ABSTRACT OF THE DISCLOSURE

Shifting apparatus for a straight-line shift type of vehicle transmission having a plurality of shift rails mounted for longitudinal movement and coupled together for displacement in opposite directions, and a gear shift lever which is selectively engageable with the shift rails and movable in straight but parallel paths to provide a folded line shift pattern to change the gear ratios of the transmission.

---

This invention relates to shifting apparatus for vehicle transmissions and, more particularly, to improvements in shifting apparatus for a vehicle transmission of the straight line shift type.

Of the various types of vehicle transmissions, the straight line or progressive type has the advantages of simplicity and shifting speed, inasmuch as it includes a sliding clutch which is moved in a linear path to select and change the gear ratios of the transmission. In the conventional straight line shift transmission, the gear shift lever also moves in a straight line path as it moves the sliding forward speed clutch in the transmission to couple and uncouple the output shaft to the input shaft through the various change speed gears in the transmission. With large trucks, construction machinery and similar vehicles, however, six, eight or more forward gear ratios are provided. If a conventional straight line shift is used with such transmissions, the extent of the traverse of the gear shift lever frequently cannot be accommodated readily in the space available in the vehicle cab.

In accordance with the present invention, I have provided a shifting mechanism for a straight-line shift vehicle transmission in which the shift lever is moved in a straight line in one direction to change, in sequence, a plurality of gear ratios, and then can be moved laterally and in a straight line in the opposite direction to change, in sequence, other gear ratios, resulting in a folded shift pattern in which the maximum traverse of the gear shift lever is substantially reduced from that which would obtain if the shift lever followed the linear path of the prior straight-line shifts. More particularly, the new shifting apparatus includes a pair of shift rails carrying the usual shifting forks or fingers coupled together so that movement of one rail in one direction drives the other rail in the opposite direction. The gear shift lever is coupled to one of the rails for selecting a predetermined series of ratios by movement in one direction, for example, first to fourth speeds in a forward direction, and can be shifted to engage the other rail at a selected ratio, whereafter movement of the shift lever in a rearward direction continues the movements of the shifter rails in their same directions for fifth and higher speeds.

For a better understanding of the present invention, reference may be had to the accompanying drawings, in which:

FIGURE 1 is a top plan view of a typical shifting apparatus embodying the present invention;

FIGURE 3 is a side elevational view of a portion of the apparatus of FIGURE 1, two shift rails being omitted for clarity;

FIGURE 4 is a plan view of a guide plate through which the gear shift lever extends and by which the shift lever is guided in a desired shift pattern in another embodiment of the invention.

Figure 2:
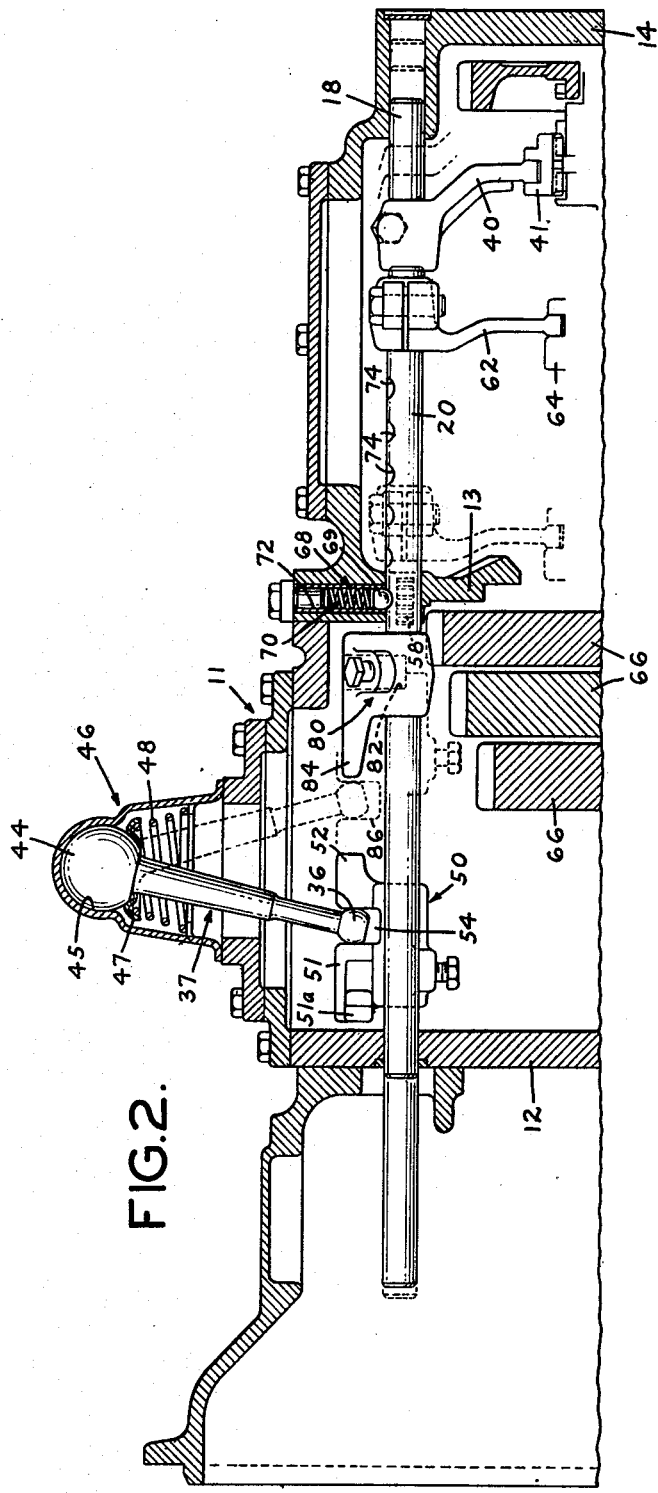
FIGURE 2 is a sectional view taken on line 2—2 of FIGURE 1.

As shown in FIGURES 1 through 3, a typical shifting mechanism according to the invention includes a transmission housing 11 having a pair of transverse supports 12 and 13, and an end support 14. A forward and reverse shift rail 18 and a pair of change speed shift rails 19 and 20 are slidably mounted in the supports 12 and 13 for longitudinal movement therein, and the forward and reverse rail 18 is also slidably received at its right end in the end support 14. Also, a guide finger 21 secured to one end of the shift rail 19 slidably engages the shift rail 18.

Secured to the forward and reverse rail 18 are a pair of shifter elements 22 and 23. The shifter element 22 has a projection 25 extending over the shift rail 19, the projection having a lateral wall 26, the upper portion of which extends over the shift rail 19 and includes an arm 27 extending longitudinally to the right, as viewed in FIGURES 1 and 3. (The shift rails 19 and 20 are omitted in FIGURE 3 for clarity). The shifter element 23 has a projection 30 extending toward and above the shift rail 19, this projection having a longitudinal front face 31 and an end face 32 in adjacent spaced relation to the lateral wall 26 of the shifter element 22. The face 32 and the lateral wall 26 define a notch 34 adapted to receive the lower end 36 of a gear shift lever 37. The end 36 is preferably rounded in its vertical and horizontal cross section to promote sliding engagement with the walls of the notch 34 and the other notches to be described hereinafter as the angular disposition of the shift lever canges and to facilitate the engagement and disengagement of the gear shift lever with each notch.

When the gear shift lever 37 is in the notch 34, the operator can move the shift rail 18 longitudinally between the forward speeds position shown in full in FIGURE 1 and the neutral and reverse positions shown in phantom. The shift rail 18 carries a forward and reverse fork 40 secured thereto, which drives a sliding clutch 41 to engage the conventional forward and reverse gears (not shown).

The gear shift lever 37 has the conventional ball pivot 44 which is rotatably received in a complementary recess 45 of a bell housing 46 secured to the transmission housing 11, the ball 44 being biased against the recess 45 by a collar 47 and a compression spring 48. A shift lever (not shown) secured to the ball 44 is moved by the operator to select desired gear ratios.

Secured to the shift rail 19 is a shifter yoke 50 having a pair of upwardly extending projections 51 and 52 defining a notch 54 therebetween adapted to receive the end 36 of the gear shift lever 37. Thus, with the shift lever engaging the notch 34 of the forward and reverse shifter 22 and 23, the shift lever may be moved longitudinally to the left as viewed in FIGURE 1 from the "reverse," through the "neutral," to the "forward" speed position, which is also the first forward speed position, and then the shift lever may be displaced laterally to engage the notch 54 of the shifter 50, after which the shift lever may be moved longitudinally to the right to the "second," "third" and "fourth" speed positions.

The shift rail 19 has a rack 56 which engages a pinion gear 58 supported by the support 13 for rotation about a vertical axis. The pinion 58 also engages a rack 60 formed in the shift rail 20. Accordingly, displacement of one of the shift rails 19 and 20 in one direction drives the other shift rail in the opposite direction.

Mounted on the shift rail 20 are one or more shift forks 62 which move a sliding clutch or clutches 64 to couple appropriate pairs of speed change gears 66 with the output shaft (not shown) of the transmission. A detent 68, including a ball 69 biased by a compression spring 70, is received in a bore 72 in the support 13 and releasably engages one of six notches 74 in the shift rail 20 when this shift rail is in one of its six speed positions.

Also secured to the shift rail 20 is a shifter yoke 80 having a notch 82 and a longitudinal projection 84. The shifters 50 and 80 are so located on the shift rails 19 and 20, respectively, that in the "fourth" speed position the notches 54 and 82 are in lateral alignment, as shown in phantom at 86 in FIGURES 1 and 2. Thus, at the "fourth" speed position the gear shift lever 37 may be displaced laterally from the notch 54 of the shifter yoke 50 to engage the notch 82 of the shifter yoke 80, after which the shift lever may be moved longitudinally to the left to the "fifth" and "sixth" speed positions.

FIGURES 5A–5H show the positions of the shift lever 37, the shift rails 18, 19 and 20, the shifter elements 22 and 23, and the shifters 50 and 80 for all of the gear ratios in the shift pattern according to the illustrated embodiment of the invention.

Similarly, to go from "sixth" to "neutral" or "reverse," the gear shift lever 37 (in engagement with the notch 82) is moved longitudinally to the right to the "fourth" position, laterally from the notch 82 to the notch 54, longitudinally to the left to the "first" position, laterally from the notch 54 to the notch 34, and then longitudinally to the right to "neutral" or "reverse."

Figure 5A:
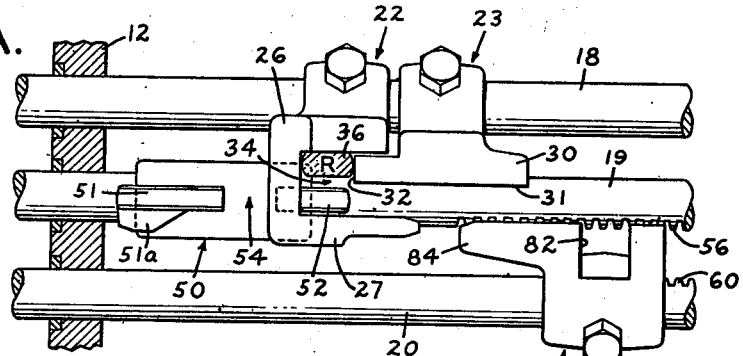
FIGURES 5A–5H are plan views of a portion of the apparatus of FIGURE 1, showing the positions of the shift lever and the shift rails corresponding to the various gear ratios.
Figure 5B:
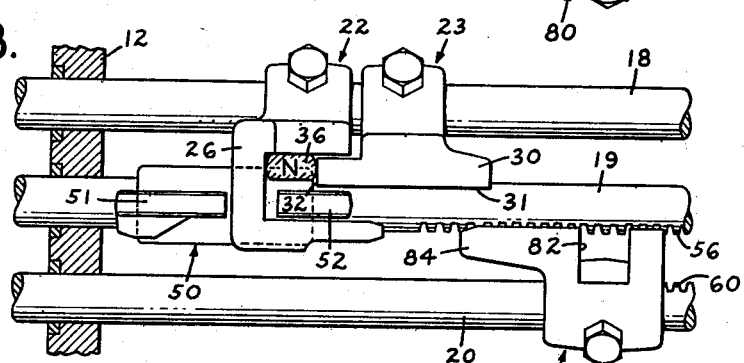
Figure 5C:
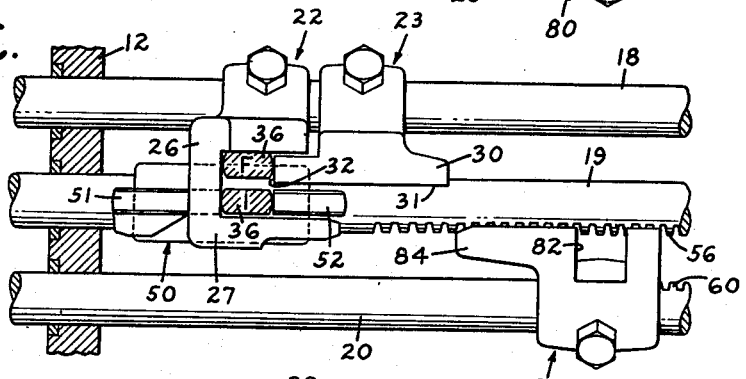
Figure 5D:
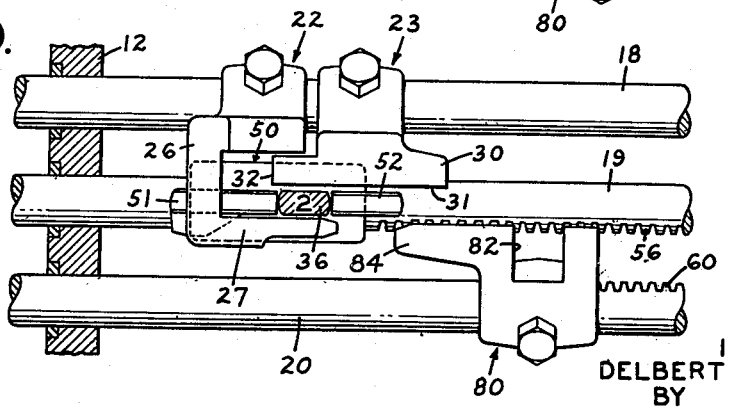
Figure 5E:
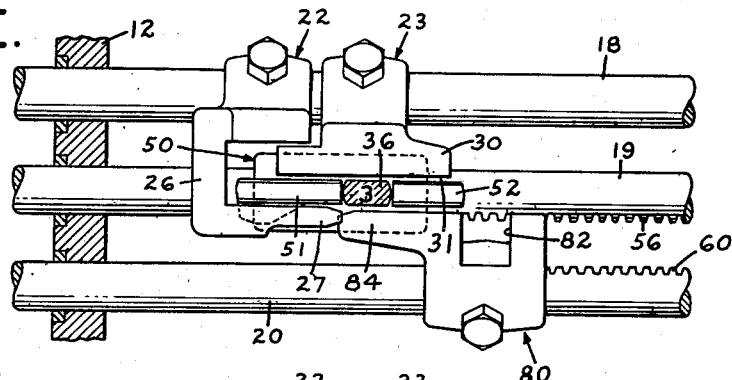
Figure 5F:
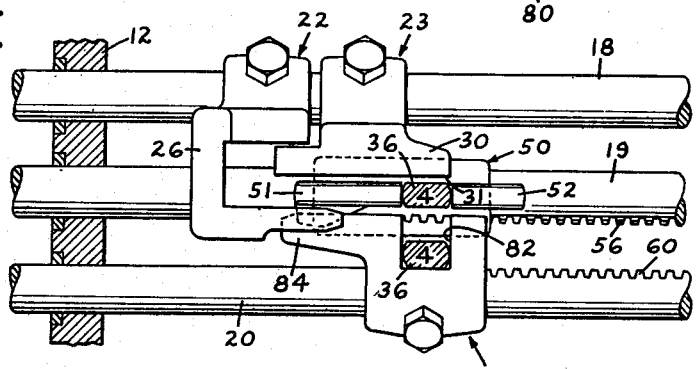
Figure 5G:
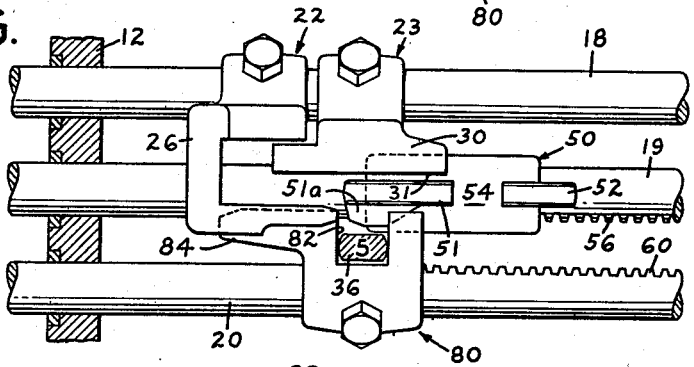
Figure 5H:
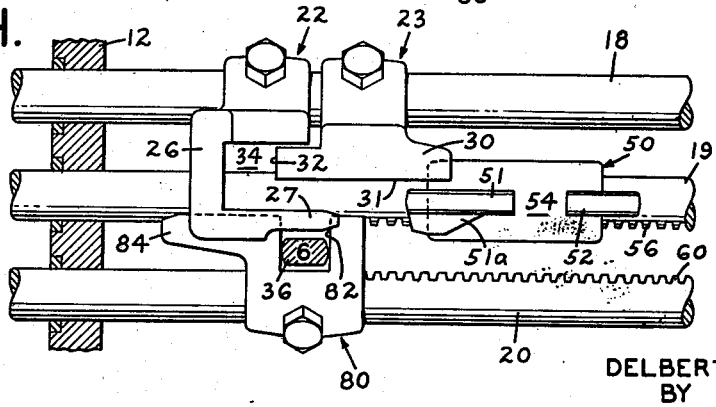

While the shift rail 18 is in the "reverse" and "neutral" positions, the gear shift lever is retained in the notch 34 of the shifter 22 and 23 by the projection 52 of the shifter 50 (see FIGURES 5A and 5B). When the shift lever is displaced laterally from the "forward" to the "first" position (which does not change the gear ratio) to engage the notch 54 of the shifter 50, the longitudinal arm 27 of the shifter element 22 retains the shift lever between the projections 51 and 52 (see FIGURE 5C). In the "second," "third" and "fourth" positions (see FIGURES 5D–5F) the notch 54 is blocked on one side by the front face 31 of the shifter element 23, while the other side of the notch 54 is blocked in "second" by the arm 27 of the shifter element 22 and in "third" by the longitudinal projection 84 of the shifter 80. The notch 82 of the shifter 80 is blocked in "fifth" (see FIGURE 5G) by the portion 51a of the projection 51 of the shifter 50, and in "sixth" (see FIGURE 5H) by the arm 27 of the shifter element 22.

Alteranatively, the arm 27 and the projections 51a and 84 may be omitted, and the shift lever 37 can be guided through the required shift pattern by a guide plate 90 (see FIGURE 4) having a substantially serpentine channel 92 through which the shift lever is disposed, the plate 90 being rigidly secured to the main housing 11 so as to be disposed substantially horizontal intermediate the end 36 and the ball 44 of the shift lever 37.

It will be understood that the apparatus is susceptible to considerable modification by those skilled in the art. For example, one or more additional shift rails may be coupled to the shift rail 20 through one or more additional pinion gears, so that additional gear ratios may be provided while "folding" the gear shift pattern one or more additional times to minimize the extent of the traverse of the gear shift lever.

I claim:

1. Shifting apparatus for a vehicle transmission of the straight line shift type having a shift fork coupled to a sliding clutch adapted to be displaced in a linear path between speed positions to engage the transmission gears comprising a first shift rail mounted for longitudinal movement, said first shift rail having a longitudinal row of teeth, a second shift rail mounted for longitudinal movement, said second shift rail having a longitudinal row of teeth, gear means engaging said teeth of said first and second shift rails so that displacement in one direction of one of said first and second shift rails drives the other shift rail in the opposite direction, a gear shift lever, first coupling means on said first shift rail for engaging said gear shift lever, and second coupling means on said second shift rail for engaging said gear shift lever, said first coupling means including means forming a first notch and said second coupling means including means forming a second notch, said first and second notches being in lateral alignment at one speed position, whereby said gear shift lever may be displaced in one longitudinal direction while engaging said first notch between at least two speed positions until said first and second notches are in lateral alignment at said one speed position, said gear shift lever may then be displaced laterally to engage said second notch and thereafter displaced in the opposite longitudinal direction to at least one additional speed position, so that said gear shift lever follows a folded line shift pattern while said shift fork and sliding clutch are displaced in a linear path.

2. Shifting apparatus for a vehicle transmission of the straight line shift type having a shift fork coupled to a sliding clutch adapted to be displaced in a linear path between speed positions to engage the transmission gears comprising a first shift rail mounted for longitudinal movement, said first shift rail having a longitudinal row of teeth, a second shift rail mounted for longitudinal movement, said second shift rail having a longitudinal row of teeth, gear means engaging said teeth of said first and second shift rails so that displacement in one direction of one of said first and second shift rails drives the other shift rail in the opposite direction, a gear shift lever, first coupling means on said first shift rail for engaging said gear shift lever, second coupling means on said second shift rail for engaging said gear shift lever, said first coupling means including means forming a first notch and said second coupling means including means forming a second notch, said first and second notches being in lateral alignment at one speed position, a third shift rail mounted for longitudinal movement, and third coupling means having means forming a third notch on said third shift rail for engaging said gear shift lever, said first and third notches being in lateral alignment at another speed position, whereby said gear shift lever may be displaced in one longitudinal direction while engaging said first notch between at least two speed positions until said first and second notches are in lateral alignment at said one speed position, said gear shift lever may then be displaced laterally to engage said second notch and thereafter displaced in the opposite longitudinal direction to at least one additional speed position, and said gear shift lever may be displaced laterally from said first notch to engage said third notch at said other speed position and thereafter displaced longitudinally to at least one additional speed position.

3. Shifting apparatus according to claim 1 including means for retaining said gear shift lever in the desired path as it is displaced between speed positions.

4. Shifting apparatus according to claim 3 wherein said retaining means includes a member having a serpentine channel in which said gear shift lever is received.

5. Shifting apparatus according to claim 3 wherein said retaining means includes means secured to said first and second shift rails for closing said first and second notches when said notches are out of lateral alignment.

6. Shifting apparatus for a vehicle transmission of the straight line shift type comprising a sliding clutch adapted to be displaced in a linear path between at least three speed positions to engage the transmission gears, a shift fork coupled to said sliding clutch for driving said sliding clutch between said speed positions, a first shift rail mounted for longitudinal movement, a second shift rail mounted for longitudinal movement, one of said first and second shift rails mounting said shift fork, means coupling said first and second shift rails so that displacement in one direction of one of said first and second shift rails drives the other shift rail in the opposite direction, a gear shift lever, means forming a first notch on said first shift rail for engaging said gear shift lever, means forming a second notch on said second shift rail for engaging said gear shift lever, said first and second notches being in lateral alignment at one position of said sliding clutch, whereby said gear shift lever may be displaced in one longitudinal direction while engaging said first notch between at least three speed positions until said first and second notches are in lateral alignment at said one position of said sliding clutch, and said gear shift lever may then be displaced laterally to engage said second notch and thereafter displaced in the opposite longitudinal direction to at least one additional speed position, so that said gear shift lever follows a folded line shift pattern while said shift fork and sliding clutch are displaced in a linear path.

7. Shifting apparatus according to claim 6 including a third shift rail mounted for longitudinal movement, and means forming a third notch on said third shift rail for engaging said gear shift lever, said first and third notches being in lateral alignment at another position of said sliding clutch, whereby said gear shift lever may be displaced laterally from said first notch to engage said third notch at said other position of said sliding clutch and thereafter displaced longitudinally to at least one additional speed position.

8. Shifting apparatus for a vehicle transmission of the straight line shift type comprising a sliding clutch adapted to be displaced in a linear path between at least three speed positions to engage the transmission gears, a shift fork coupled to said sliding clutch for driving said sliding clutch between said speed positions, a first shift rail mounted for longitudinal movement, a second shift rail mounted for longitudinal movement, one of said first and second shift rails mounting said shift fork, means coupling said first and second shift rails so that displacement in one direction of one of said first and second shift rails drives the other shift rail in the opposite direction, a gear shift lever, means forming a first notch on said first shift rail for engaging said gear shift lever, means forming a second notch on said second shift rail for engaging said gear shift lever, said first and second notches being in lateral alignment at one position of said sliding clutch, whereby said gear shift lever may be displaced in one longitudinal direction while engaging said first notch between at least two speed positions until said first and second notches are in lateral alignment at said one position of said sliding clutch, and said gear shift lever may then be displaced laterally to engage said second notch and thereafter displaced in the opposite longitudinal direction to at least one additional speed position, so that said gear shift lever follows a folded line shift pattern while said shift fork and sliding clutch are displaced in a linear path.

References Cited
UNITED STATES PATENTS

| | | | |
|---|---|---|---|
| 2,273,068 | 2/1942 | Ross et al. | 74—473 |
| 2,331,704 | 10/1943 | Lange | 74—473 |
| 2,465,885 | 3/1949 | Koster et al. | 74—473 X |

MILTON KAUFMAN, Primary Examiner